United States Patent [19]

Beasley

[11] Patent Number: 5,269,347
[45] Date of Patent: Dec. 14, 1993

[54] FLUID PRESSURE ISOLATOR APPARATUS

[75] Inventor: Marvin E. Beasley, Houston, Tex.

[73] Assignee: Keystone International Holdings Corp.

[21] Appl. No.: 995,138

[22] Filed: Dec. 22, 1992

[51] Int. Cl.⁵ .................... F16K 11/02; F16K 11/087
[52] U.S. Cl. ................................... 137/864; 137/887; 137/607
[58] Field of Search ............ 137/887, 883, 864, 627.3, 137/625.47, 884, 862, 625.22, 607

[56] References Cited

U.S. PATENT DOCUMENTS

| | | |
|---|---|---|
| 826,337 | 7/1906 | Kluhsmeier . |
| 1,194,676 | 8/1916 | Slaw . |
| 1,285,267 | 11/1918 | Lund . |
| 1,988,945 | 1/1935 | Hansen .................. 137/607 |
| 3,680,597 | 8/1972 | Obermaier ............. 137/607 |
| 3,894,559 | 7/1975 | Depuy ................. 137/625.47 |
| 4,385,641 | 5/1983 | Albertin et al. ............ 137/862 |
| 4,403,626 | 9/1983 | Paul, Jr. .............. 137/625.47 |
| 4,585,032 | 4/1986 | Van Lingen . |
| 4,749,004 | 6/1988 | Peash .................... 137/887 |
| 4,821,772 | 4/1989 | Anderson, Jr. et al. . |

Primary Examiner—Martin P. Schwadron
Attorney, Agent, or Firm—Bush, Moseley & Riddle

[57] ABSTRACT

An isolator flow control apparatus (10) especially to selectively control communication of a contained fluid to an overpressure protection system. The isolator apparatus (10) includes a flow housing (12) having a single inlet opening (20) placed in fluid communication by an internal manifold means with a plurality of outlet openings (22, 24). A floating rotatable ball closure member (28, 30) is operably disposed in each of the outlet openings (22, 24) for effecting a metal-to-metal seal with a fixed downstream seat (16d, 18d). The ball closure members (28, 30) are interlocked by a shaft (34) in a passage (14b) extending between enlarged diameter portions (22a, 24A) receiving the ball closure members (28, 30). The ball closure members (28, 30) are actuated by an operator means (40) for automatically closing or isolating a selected outlet opening (22 or 24) while opening another outlet opening (22 or 24) to ensure continuous fluid flow or fluid communication through the isolator apparatus (10).

7 Claims, 2 Drawing Sheets

FLUID PRESSURE ISOLATOR APPARATUS

BACKGROUND OF THE INVENTION

1. Field of the Invention

The present invention generally relates to the field of a new and improved fluid pressure isolator apparatus and more specifically to a fluid pressure isolator apparatus for selectively controlling communication of a contained pressurized fluid to at least one of a plurality of outlets.

2. Description of the Related Art

Overpressure conditions occurring in a fluid containment system are universally recognized as potentially being extremely hazardous to life, property and the environment. When a fluid is contained under pressure within any flow or working system, any increase or build up in internal fluid pressure inherently subjects the entire fluid containment system to this greater fluid pressure. Most fluid containment systems are designed and constructed with appropriate containment components having appropriate safety factors to safely handle the anticipated or planned fluid pressure for the system. On occasion, the actual fluid pressure present in the flow system may exceed the anticipated or design range of the fluid containment equipment. This unanticipated actual fluid pressure increase or build up may result from a wide variety of causes including equipment malfunction or human error. If this unanticipated increase in fluid pressure is permitted to exceed the design capability of the fluid containment system, a failure of the weakest containment equipment component in the fluid containment system will normally occur. Such failure may be structurally catastrophic resulting in an explosion like destruction of the fluid containment system component to uncontrollably release or vent the overpressured fluid into the environment. Many contained or working fluids are extremely hazardous or flammable when released into the environment for compounding the overpressure hazard.

To prevent such undesired equipment failures and uncontrolled loss of fluid from an overpressure condition, most fluid containment systems are provided with some form of safety pressure relief protection to release or vent the excess fluid pressure in a controlled, prearranged manner before equipment failure occurs. Often statutory law and governmental regulations mandate such safety protection to release the excessive pressure build up. In addition, most widely accepted industry standards or codes and insurance carriers recommend or require the use of such overpressure safety devices. However, to be effective the safety device must be in flow communication with the contained pressure system. If blocked from communication with the contained fluid system, the safety device is rendered inoperable for its intended purpose.

In general, such overpressure safety devices usually take the form of safety valves or rupture discs. Both forms of safety devices are well known to those skilled in the art and are commercially available from a large number of suppliers. As a general characterization, a rupture disc is a thin membrane of controlled thickness that is designed to blow out or destructively fail at a specified or selected overpressure and release the contained fluid to prevent further pressure build up. After such use the failed rupture disc must be replaced. In general, a pressure safety valve has a movable closure element biased closed by a spring or the like and is enabled to shift to an open position when the fluid pressure reaches a specified or selected overpressure that overcomes the predetermined spring force. Unlike the rupture disc, the safety valve may operate to close when the excess pressure of the contained fluid system is released. However, after each pressure relief operation it is accepted practice to clean and maintain the safety valve including calibration or resetting of the biasing spring to confirm the release setting pressure is proper. While specific overpressure safety devices are outside the scope of the present invention, the apparatus of the present invention is especially well adapted for use in combination with any type of overpressure safety devices to enable desired testing, maintenance or replacement without interrupting operation of the associated pressurized flow system.

U.S. Pat. No. 826,337, to Kluhsmeier, entitled "Liquid Cooler" discloses a valved cross flow heat exchanger flow apparatus for simultaneously cooling beer and water. The disclosed flow apparatus also provides only a single manually operated valve for the outlet of either fluid. No means for coordinating or selective operation of either outlet valve or fluid overpressure protection is disclosed.

In Shaw U.S. Pat. No. 1,194,676 there is disclosed a manually operated or actuated control valve mechanism for a contained hydraulic fluid system having a double acting piston. The control valve system or mechanism is formed by two separated manually operated valves having mechanically linked operating levers for the paired valves so that when one of the valves is positioned to close the hydraulic fluid exhaust, the other is open to the exhaust system. No safety overpressure means for the hydraulic working fluid is disclosed.

Lund U.S. Pat. No. 1,285,267 is entitled "Internal Combustion Engine". The various disclosed supply and return flow arrangements for circulating coolant between the engine cylinder block and radiator heat exchanger are provided with suitable manually operated block and bleed valves to enable draining of the engine block without disturbing the radiator coolant. To ensure complete radiator coolant isolation from the engine block, the manual operating levers of the system block valves or cocks may be connected so they may be moved between the open and closed positions simultaneously. No safety overpressure means is expressly disclosed, although in most current automobiles the radiator cap serves as a safety pressure relief valve for the engine coolant.

U.S. Pat. No. 4,403,626 to Paul, Jr. discloses a low internal flow restriction multiple outlet valve apparatus having a single movable flow directing or controlling member employed in conjunction with an overpressure relief system of at least two separate safety devices. The single movable flow directing member is selectively positioned automatically or manually to enable or direct the flow from the single inlet to the selected outlet communicating with at least one safety device of the overpressure relief system. Rotation of the stem and connected flow directing member aligns either first or second apertures or passageways formed in the flow directing member at 90 degree angles with a selected housing port. Upon operation of a rupture disc, a suitable pressure or other sensor provides a signal to a computer controller which activates the stem operator to select the other port.

U.S. Pat. No. 4,585,032 to Van Linger is entitled "Motor Operated Tandem Valve Assembly". The disclosed assembly simultaneously operates a plurality of conventional low pressure thermoplastic flow control valves to achieve the desired flow sequence. The disclosed actuator or valve operating reversible motor means is used to selectively move or operate the conventional butterfly or ball valves through a quarter turn (90°) arc using an adjustable linkage pivotally connecting the valve stem operating handles or levers.

Anderson U.S. Pat. No. 4,821,772 is entitled "Dual Active Selector Valve". The disclosed selector valve apparatus includes a fluid containment body having a single fluid inlet and at least two spaced fluid outlets that are spaced 180 degrees apart. A movable rotor disposed internally of the valve body is used to selectively control fluid communication between the inlet and at least one of the plurality of outlets while blocking fluid communication with another of the outlets to enable safety device replacement or maintenance without interfering with operation of the contained working fluid system. The rotor forms three curved flow conduits and a flow closure disc which are circumferentially disposed on the rotor with a 90 degree angle or arc spacing therebetween. When the closure disc is separated from the fixed seat to break any seal therebetween, the rotor may be freely rotated to achieve the desired alignment. To effect the longitudinal or axial movement of the shaft or mounting pin for effecting closure disc spacing, a separate rotatable lock assembly is employed. To ensure proper axial and rotational positioning of the rotor with the body during locking and unlocking operations a complicated and expensive to manufacture positioning lug and slotted ring arrangement is employed.

Each of the above identified patents is hereby fully and completely incorporated in the present disclosure by this specific reference as if their entire content were set forth in full herein.

SUMMARY OF THE INVENTION

The new and improved fluid pressure isolator apparatus of the present invention provides for selective controlled communication of a contained pressurized fluid system to at least one of a plurality of outlets. The apparatus is especially useful in enabling maintenance, testing and replacement of downstream overpressure safety devices without rendering the entire safety system inoperable or shutting down the pressurized fluid system, but is not to be considered as limited to only that specific application.

The present invention provides a fail safe system for a pair of safety devices such as safety relief valves in which one relief valve is always in service and the other relief valve is out of service as may be necessary for maintenance. In a preferred embodiment, a housing has an inlet which may be diverted to either one of a pair of outlets which are in fluid communication with the safety devices. An integral interlock is provided by a connecting stem or shaft between a pair of flow control members in the outlets which control fluid flow from the inlet to the outlets for the safety devices. A single actuating means for movement of the connecting stem for the flow control members is provided and the actuating means is located in one of two positions depending on which outlet is selected for fluid communication with the inlet which is normally in fluid communication with a pressure vessel, such as a tank.

The isolator apparatus includes a flow housing having a main body and a plurality of tubular members arranged to internally contain the fluid under pressure. The flow housing includes an inlet and a plurality of outlets for receiving and enabling discharge of the fluid. The flow housing includes an internal manifold means for communicating the inlet with each of the plurality of outlets. A floating rotatable ball valve flow closure member is disposed in each of the plurality of outlets for co-acting with an annular seat sealing surface fixed in each outlet downstream of the ball. This arrangement provides a metal-to-metal fluid seal in each outlet with the sealing contact pressure responsive to the differential pressure across the closed ball. An operator means operably connects each ball member for effecting desired selective movement of each ball member to and from the open and closed position from exteriorly of the flow housing. The operating means insures that at all times one of the outlets is open to enable flow through the isolator apparatus.

DESCRIPTION OF THE PREFERRED EMBODIMENT

Figure 1:
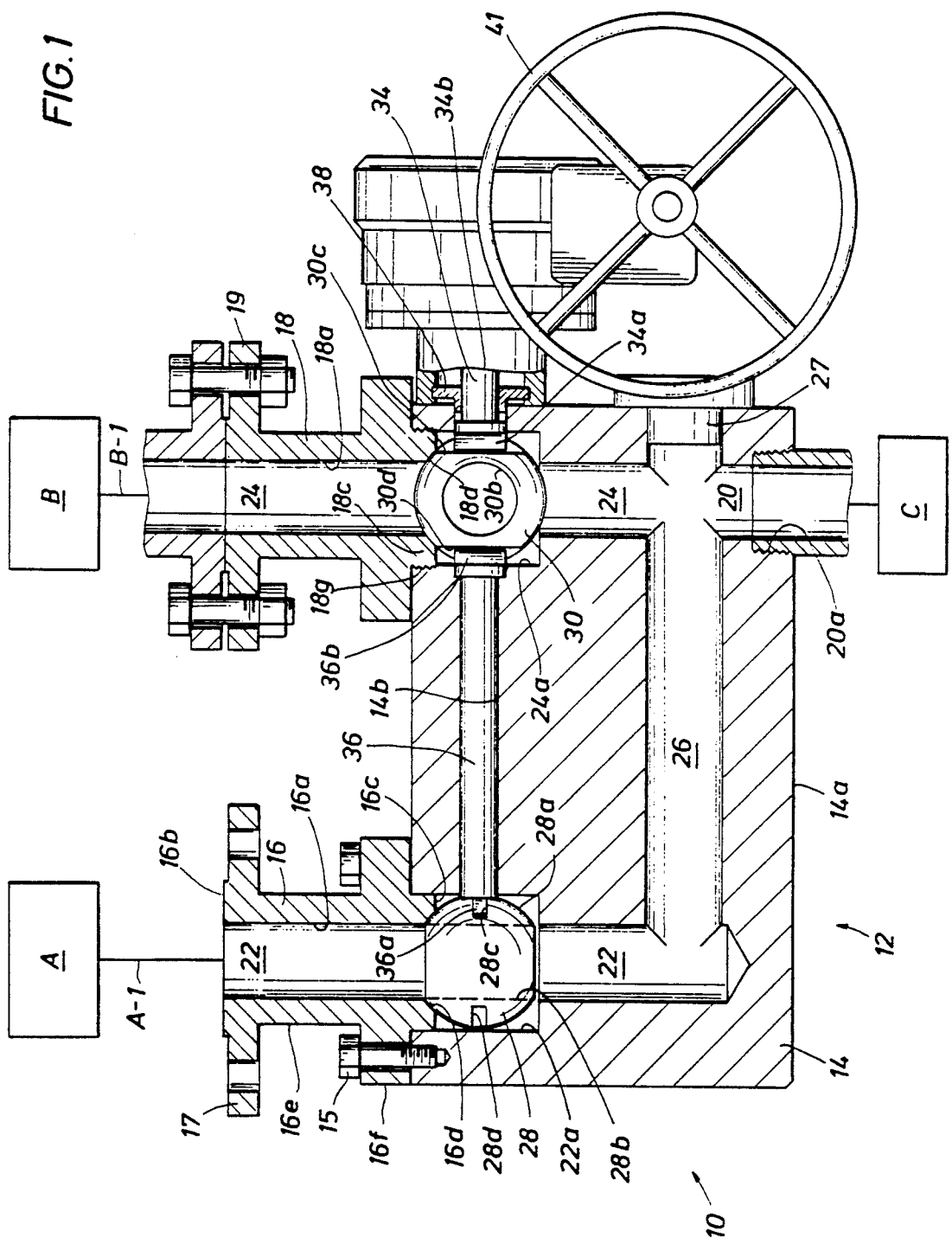
FIG. 1 is a sectioned side view of a first form or embodiment of the fluid pressure isolator apparatus of the present invention and further illustrating the utility of the apparatus in a contained fluid overpressure safety system.
Figure 2:
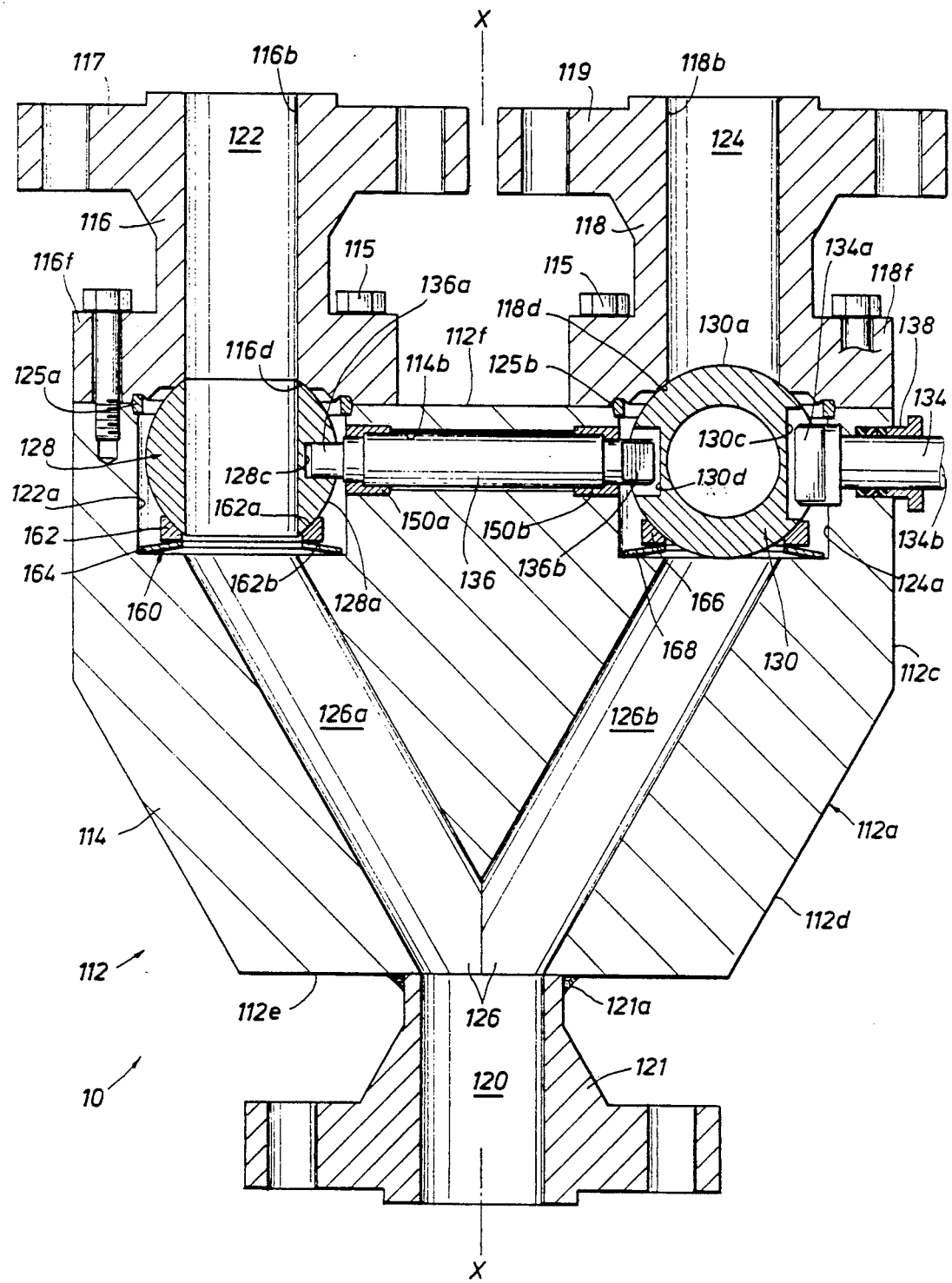
FIG. 2 is a sectioned side view of a second embodiment of an apparatus of the present invention.

The fluid pressure or flow isolator apparatus of the present invention is illustrated in one form or embodiment in FIG. 1 and in a second form in FIG. 2. As illustrated in FIG. 1, the isolator apparatus, generally designated 10, is especially useful in selectively blocking or isolating one of a plurality of fluid pressure safety devices, schematically illustrated and referenced as A and B, from an associated contained pressurized fluid system, schematically indicated generally at C, which is subject to possible overpressure conditions while insuring that the other safety device remains in continuous communication with the fluid system C to provide the overpressure protection. It will be understood by those skilled in the art of piping and pressure vessel system design that the fluid pressure apparatus 10 is also adapted to and well suited for selectively controlling or isolating fluid flow in many other flow control applications where a continuous flow outlet is desired. For that reason the title of the invention and its description herein in that specific context should not be considered as limiting on the proper scope of the present invention, but rather for establishing a preferred utility or manner of application in actual practice.

The associated overpressure protected contained fluid system C may be for any desired purpose without departing from the scope of the present invention. A non-exhaustive list of examples of typical contained fluid systems suitable for use with the present invention may include a single pipeline, a piping network, a pressure vessel, a tank or a boiler. The present invention should also not be considered as limited in useful application to any particular type or form (liquid, gas, vapor or combination thereof) of fluid present in the fluid system C.

The particular form or type of the overpressure safety device A or B preferably employed in use or combination with the apparatus 10 of the present invention is outside the scope of the present invention. Such overpressure safety devices are well known to those skilled in the art and are commercially available from a number of suppliers in numerous types and many models. For that reason, such safety devices need not be described in great detail. Typically, each of the overpressure safety devices A or B will either be a rupture disc assembly or a pressure relief safety valve apparatus, but other forms or types of safety pressure relief devices are equally suitable for use with the present invention. The pressure safety devices A or B may be mounted either directly with the apparatus 10 or indirectly placed in contained flow communication with the apparatus 10 by use of a conventional, appropriate first flow confining conduit A-1 and second flow conduit B-1 (illustrated schematically) in the conventional, known manner.

As illustrated in FIG. 1, the apparatus 10 of the present invention includes a valve casing or flow housing, generally indicated at 12, having a main fluid pressure containment body 14 and a plurality of tubular outlet nozzles or members 16 and 18 fixedly secured or mounted to the body 14. The flow housing 12 serves to internally contain the fluid under pressure and is suitably formed and sealed for that purpose. Those skilled in the art of the design and construction of valves or other flow control devices may modify or vary the disclosed preferred form of construction or structural arrangement of the flow housing 12 without departing from the scope of the present invention.

The main body 14 includes an outer or exterior surface 14a and is preferably formed or manufactured from a suitable metal casting or forging to safely contain internal fluid pressure. In the embodiment of FIG. 1, the body 12 has the general configuration of rectangular block for simplified design, construction and ease of manufacturing. The plurality of metal tubular members 16 and 18 are releasably fixedly secured and sealed to the main body 14 by suitable, known means for maintaining desired pressure containment integrity. While a preferred plurality of two tubular members 16 and 18 are illustrated and described, those skilled in the art of the present invention can readily appreciate that a plurality of greater than the two outlet tubular members 16 and 18 may be employed without departing from the scope of the present invention.

For purposes of simplified construction, economy of manufacture and interchangeable assembly in actual practice, the plurality of metal outlet tubular members 16 and 18 are preferably essentially made identical in construction. For that reason only the tubular member 16 will be described in detail, but with like reference alphabetical characters used in this disclosure to designate and reference like parts of the tubular member 18.

The outlet tubular member 16 includes a longitudinally extending internal bore or central passageway opening 16a forming a contained internal contained fluid flow passage therethrough. The longitudinally extending tubular member 16 include an outer or external annular end 16b and an inner annular end 16c that is received internally within the body 14. The outer end 16b mounts a suitable known, conventional pipe or conduit connecting means, such as a conventional flange 17 or the like, for releasably securing the flow housing 12 in sealed flow communication with a discharge flow conduit A-1 communicating with the safety device A. A similar flange 19 is mounted on the tubular member 18 for bolted connecting with a corresponding or mating flange (not referenced) of the flow conduit B-1 in the well known manner. The annular inner end 16c forms an arcuate annular sealing surface 16d in surrounding relationship to the central bore 16a for purposes to be more fully disclosed hereinafter. The tubular member 16 also includes a generally cylindrical outer surface 16e having an outer positioning and securing collar 16f that tightly engages and seals with the body 14 upon assembly of the apparatus 10. The sealing engagement of the collar 16f with the exterior surface 14a of the body 14 also serves to precisely position or fix the location of the annular spherical sealing surface 16d within the flow housing 12.

For purposes of this disclosure, the tubular member 16 is illustrated in FIG. 1 as being releasably connected or secured to the body 12 with a flange type mounting formed by the external collar 16f using a conventional, known plurality of equi-circumferentially spaced connecting bolts 15 while tubular member 18 is illustrated and formed with external pin or male connecting threads 18g adjacent inner end 18c that interengage with complementary mating threads (not referenced) formed on the body 14. Such different known means for releasably mounting of the tubular members 16 and 18 are illustrated and described for equivalent disclosure purposes only and should not be considered as a typical arrangement as it is preferred that the tubular members 16 and 18 be made identical in construction for assembly and maintenance purposes. If desired, conventional gaskets (not illustrated) may be utilized between the abutting or mating flange fluid sealing areas of the collar 16f and the exterior surface 14a of the body 14 in the known manner. Also if desired, those skilled in the art of valve and flow control equipment design and construction may utilize or select one of the many other known conventional methods of sealed releasable securing construction of the flow housing 12.

The flow housing 12 includes an inlet port opening or fluid flow communicating means 20 formed in the body 14 for operably receiving or enabling flow of the fluid into the flow housing 12 from the contained pressurized fluid system C. The inlet opening or port 20 is formed of suitable ample interior size or cross-section diameter to provide a minimum restriction to communicate fluid flow through the apparatus 10. In FIG. 1, an internal or box helical threaded connection 20a is illustrated for sealingly connection with the contained fluid system C, but other known or equivalent arrangements may be employed by those skilled in the art.

The apparatus 10 also includes a plurality of outlet port openings or flow communication means formed in the flow housing 12 for enabling desired discharge, outlet or exhaust flow of fluid from the body 12 and tubular members 16 and 18 of the flow housing 12. Each of the outlets or outlet openings 22 and 24 is preferably formed with an enlarged diameter portion 22a or 24a for receiving a portion of the inner end 16c and 18c of one of the tubular members 16 and 18. In this manner the central bores 16a and 18a of the tubular members 16 and 18 form portions of the flow outlets 22 and 24, respectively, of the flow housing 12. Each of the outlet openings or exit flow ports 22 and 24 is located or positioned in the body 14 of the flow housing 12 in an operably and physically spaced relationship with the inlet opening 20 and each of the other of the fluid discharge or exit flow ports or outlet openings to provide adequate access for enabling suitable flow connection with the associated supply or discharge fluid conduits A-1 or B-1 and the pressurized fluid system C. This is done so adequate working clearance exists adjacent the inlet 20 and each outlet 22 and 24 to enable making of the appropriate piping connections. While a plurality of two outlets 22 and 24 are illustrated and described for purposes of this disclosure, those skilled in the art of valve design and construction will immediately recognize that a plurality of more than two flow outlets 22 and 24 may be provided if desired by the apparatus 10 by repeating the disclosed arrangement without departing from the scope of the present invention. Each of the outlets 22 and 24 is preferably formed with a cross-sectional flow area substantially the same or larger than inlet 20.

Suitable means are provided or mounted on the flow housing 12 for enabling operable flow or fluid communication connection of the inlet opening 20 and each of the plurality of outlet or discharge ports 22 and 24 with the pressurized fluid system C and safety devices A and B in the known, conventional manner. In the illustrated embodiment of FIG. 1 such connection means are provided by the suitable standard or conventional flanges 17 and 19 for providing equi-circumferencial spaced bolted (not referenced) securing with mating conventional corresponding flanges in the usual manner. The inlet opening 20 is illustrated to have threads 20a for providing such means for operably connecting to the container pressure system C. However, the present invention should not be considered as limited to the illustrated releasable connecting means. It will be appreciated by those skilled in the art that any suitable known equivalent means such as threaded, hub and clamp, welded (butt and socket) or the like may be employed for operably connecting the inlet 20 or any of the outlets 22 and 24 of the flow housing 12 in desired flow communication.

The flow housing 12 also includes a contained fluid distribution flow passage or manifold means 26 formed internally therein for continuously communicating the fluid inlet opening 20 with each of the plurality of fluid outlet openings 22 and 24 to enable fluid flow or communication therebetween. The substantially straight manifold passage 26 is also manufactured or formed with a sufficient flow area size or diameter to minimize resistance to flow therethrough and intersects each of the outlet openings 22 and 24 at substantially a right angle. During manufacture the manifold passage 26 is formed by drilling or boring and then welding or bolting the body 14 closed by use of plug 27 to preserve the sealing integrity of the flow housing 12. Such a simplified arrangement is preferred for economy of manufacture and simplicity of design.

The apparatus 10 includes a plurality of movable ball-type flow control or closure members or means 28 and 30 operably disposed in the enlarged diameter portions 22a and 24a defining a value chamber for each of the corresponding outlets 22 and 24, respectively. Each of the illustrated substantially spherical or ball-type flow closure members 28 and 30 is operably moved or rotated through a 90 degree arc or quarter turn to and from the open position for enabling or communicating fluid pressure or flow through the mounting or associated outlet and a closed position for blocking flow or communication through that same outlet. In this manner the selected position of ball member 28 controls communication only through outlet 22 while that of the ball member 30 selectively controls communication only through outlet 24. In FIG. 1, the ball member 28 is illustrated in the open position with ball member 30 positioned in the closed position. During assembly of the apparatus 10, the metal ball members 28 and 30 are operably positioned in the enlarged portions 22a and 24a of the outlets 22 and 24 before the tubular members 16 and 18 are secured to the body 14. This sequence of assembly positions the co-acting annular sealing or seal surfaces 16d and 18d downstream of the ball members 28 and 30 for forming a downstream fluid seal and a longitudinal movement or travel limit stop. Before assembly each metal ball member 28 and 30 is lapped seated to the mating arcuate seat surface 16d and 18d, respectively, to effect a metal-to-metal fluid seal therebetween during use of the apparatus 10. The enabled limited longitudinal floating movement or travel of each ball member 28 and 30 insures that the co-acting ball or ball member will move or shift into metal-to-metal sealing engagement with the fixed seat surfaces 16d and 18d in response to fluid pressure induced travel.

As the metal flow closure ball-type members 28 and 30 are preferably identical in construction and operation it is only necessary to describe that of the ball member 28 in detail. For disclosure purposes, like reference alphabetical characters will be used to designate and reference like parts of the ball member 30. The metal ball member 28 includes a substantially spherical outer sealing surface 28a having a straight flow enabling bore 28b formed therethrough. The spherical surface 28a engages the fixed annular sealing surface 16d of the metal tubular member 16 to block leakage of fluid therebetween and for directing enabled flow or fluid communication through the ball bore 28b to also pass through to the associated central bore 16a of the tubular member 16 forming outlet 22. When the flow passage bore 28b is positioned in alignment with the outlet 22 the ball member 28 is in the open position as illustrated in FIG. 1, and fluid communication or flow is enabled through the bore 16a and outlet 22. Positioning the bore 28b transverse to the outlet 22 places the ball member 28 in the closed position and blocks fluid communicate or flow through the outlet 22 by engagement of the spherical sealing surface 28a with that of the co-acting seat surface 16d. The ball member 28 is rotated through a quarter turn arc (90 degrees) in moving the alignment or position of the bore 28b between the open and closed positions. Bore 28b of ball member 28 and corresponding bore 30b of the ball member 30 each has a circular cross-sectional flow area as best illustrated by bore 30b in FIG. 1. Preferably the flow area or cross-sectional diameter of the bores or openings 28b and 30b through the ball members 28 and 30 is substantially the same as that of the outlet passageway 16a and manifold passage 26 to provide a full size opening to minimize flow resistance within the flow housing 12.

The outer surface 28a of the ball member 28 is preferably formed with a plurality of conventional operating recesses or slots 28c and 28d for enabling the desired quick acting quarter turn operating rotation of the ball member 28 as will be described in greater detail hereinafter. The operating slots 28c and 28d are located diametrically opposite to each other or across the ball member 28 for concentric alignment purposes. The elongated slots 28c and 28d are preferably oriented or disposed to extend in a parallel aligned relationship to each other and at a right angle to the central axis formed by the bore 28b. This slot arrangement enables a small additional increment or range of floating or longitudinal travel movement of the ball member 28 in a closed position toward the downstream seat 16d to ensure proper sealing with the seal 16d while preserving adequate operating alignment during rotational operation.

The apparatus 10 includes an operator means, generally designated 32, operably connecting each of the ball members 28 and 30 for effecting selective controlled rotational movement of each from externally of the flow housing 12. The operator means 32 is also arranged for selectively positioning at least one of the ball members 28 and 30 in the open position when at least one of the other ball members 28 and 30 is placed in the closed position. This operating relationship inherently and intentionally precludes all of the outlets 22 and 24 from blocking fluid communication of the pressurized system C with safety devices A and B at any one time so that fluid communication through the apparatus 10 is continuous. Expressed another way, the operator selectively isolates or blocks fluid communication through one outlet while enabling flow or fluid communication through the other. As a result overpressure protection is always available to contained fluid pressure system C.

The operating means 32 includes an operating member or shaft 34 and at least one ball interconnecting member or shaft 36. To operably mount and provide assembly and operating clearance for the operator means 32 within the flow housing 12, the body 14 is formed with a straight through shaft receiving opening 14b connecting the exterior surface 14a and the enlarged portions 22a and 24a of each of the outlets 22 and 24. The shafts 34 and 36 are suitably journaled or rotatably mounted in the opening 14b as to be concentrically longitudinally aligned for rotating about a common axis. The straight shaft receiving opening 14b is preferably formed or drilled in the same manner as the manifold passage 26 to insure proper concentric shaft alignment. For disclosure purposes only a single interconnecting shaft 36 is described and illustrated, but it will be immediately apparent that the disclosed operating arrangement may be repeated for any number of additional fluid outlets having flow control ball members operably positioned therein.

The ball interconnecting shaft 36 is rotatably journaled in the opening 14b between the enlarged portions 22a and 24a of the outlets 22 and 24 for operably connecting the ball members 28 and 30. The ball interconnecting shaft 36 includes a first blade end 36a and a second blade end 36b. Both ends 36a and 36b are provided or formed with a flat blade that is received or operably positioned in the operating slot of one ball member for providing a positive rotational operating connection therebetween. The first blade end 36a is operably connected or received in the slot 28c of the ball member 28 while the second blade end 36b is operably received in the slot 30d of the ball member 30. Preferably the flat blades on the ends of the shaft 36 are disposed perpendicular to each other so that when one of the interconnected ball members 28 and 30 is in the closed position the other is automatically operated to the open position as illustrated in FIG. 1. Those skilled in the art may vary or reverse the disclosed preferred structural ball and shaft connection by modifying the relative alignment of the operating slots on the ball and the blades on the operating shaft 36 in the known manner. Other known arrangements for operably connecting the ball members 28 and 30 with the shafts 34 and 36 may be employed by those skilled in the art. Preferably the interconnecting shaft 36 is installed before either of the balls or ball members 28 and 30 for ease of assembly.

The operating shaft 34 is rotatably journaled in operating bore 14b adjacent the exterior surface 14a and includes an internal blade end 34a and an external end 34b. The internal end 34a forms a blade type connection for operably engaging the operating slot 30c formed in the ball member 30 diametrically across from the ball operating slot 30d operably engaging the interconnecting shaft 36. The exterior end 34b of the operating shaft 34 extends outwardly of the exterior surface 14a of the body 14 to enable the desired shaft operating manipulation. Rotation of the operating shaft 34 effects automatic simultaneous rotation of the ball member 30, the interconnecting shaft 36 and ball member 28 as a concentric, integral movement unit.

A conventional known adjustable stem packing gland assembly or means 38 is releasably mounted on the body 14 of flow housing 12 in concentric surrounding relationship to the operating shaft 34 between the ends 34a and 34b to prevent leakage or escape of fluid from the housing 12. The packing gland assembly 38 enables the desired quarter turn rotational movement of the journaled operating shaft 34 while maintaining fluid containment sealing by the flow housing 12. As the outlet fluid seal of each seat means 16d and 18d and the spherical outer surface 28a and 30a of each ball member 28 and 30 is located downstream of the operating opening 14b formed in the body 14, it is not necessary to seal the interconnecting shaft 36 with the body 14.

A plurality of fixed valve seat rings or annular sealing means are provided by the arcuate sealing surfaces 16d and 18d of tubular members 16 and 18 that are fixedly mounted to the body 14 in concentric surrounding sealed relationship to the portion of the outlets 22 and 24 formed through bores 16a and 18a. The preferred blade and slot connection of the operating members with each of the ball members 28 and 30 enables a limited longitudinal floating movement or increment of travel of the closed ball member toward the fixed downstream valve seat surface 16d or 18d to ensure proper downstream sealing engagement. With this operating connection arrangement an increased fluid pressure differential across the closed ball member 28 or 30 will also increase the metal-to-metal sealing contact pressure with the fixed seats 16d and 18d to minimize leakage through the selected closed outlet 22 or 24. Because of the disclosed metal-to-metal downstream pressure responsive sealing arrangement the alternatively closed balls 28 and 30 can safely contain extremely high pressures without leakage.

The apparatus 10 may include a valve actuator assembly, control device or means, generally designated 40 in FIG. 1, for selectively moving the operating shaft 34, the ball connecting shaft 36 and the ball members 28 and 30 to and from the open and closed positions from externally of the housing 12. If the balls 28 and 30 are sufficiently small in diameter size to limit operating torque requirements of the shaft 34 the actuator device means 40 may simply be a conventional valve operating lever (not illustrated) for manually rotating the operating shaft 34. The illustrated valve actuator device 40, when employed is mounted exteriorly on the flow housing 12 and includes a conventional, commercially available quarter turn output drive that is operably coupled or connected to the external end 34b of the operating shaft 34. The well known actuator assembly 40 is in essence a gear box drive that may be remotely controlled or operated manually by hand wheel 41. Any desired known conventional means of operably connecting the external end 34b of the operating shaft 34 to the valve actuator device 40 may be employed including splines, keys, flanged couplings and the like. If desired, the actuator device 40 may include a suitable pneumatic, electrical or hydraulic power motor for remote controlled operation of the apparatus 10.

In FIG. 2, a second embodiment of the apparatus 10 of the present invention is illustrated. The arrangement, use and operation fluid pressure isolator apparatus 10 of the second embodiment is substantially the same as that of the first embodiment of FIG. 1, but is structurally different in some ways. In describing the second embodiment like reference characters, increased by a factor of 100, will be used to designate corresponding like parts of the first embodiment. Unless noted otherwise, these like reference parts perform substantially the same operation and function as the corresponding parts in the first embodiment.

As illustrated in FIG. 2, the second embodiment of the apparatus 10 includes a flow housing 112 having a main fluid pressure containment body 114 and a plurality of tubular outlet nozzles or members 116 and 118. The body 112 forms a central longitudinal axis X—X that is preferably disposed in a substantially vertical orientation when the apparatus 10 is installed for operation. The exterior surface 112a of the body 112 includes a cylindrically shaped upper side portion 112c and a concentrically tapered lower conical side portion 112d that are machined or formed concentrically about axis X—X. A conventional weld neck flange 121 for releasably connecting the inlet 120 in flow communication with the pressurized system C is concentrically welded at 121a or secured by other suitable means to the circular lower or bottom flat surface portion 112e of the body 112.

The plurality of outlet tubular nozzle members 116 and 118 are releasably secured and sealed to the upwardly facing flat, circular exterior surface portion 112f, using conventional attachment collar flanges 116f and 118f with a plurality of threaded bolts 115 in substantially the same or similar manner to that disclosed in the first embodiment. The two tubular nozzle members 116 and 118 are preferably located on a common radius from the axis X—X and are circumferentially spaced 180 degrees apart or on a common diameter. The tubular members 116 and 118 mount conventional connecting flanges 117 and 119, respectively, for releasably connecting to the downstream pressure safety devices in a manner also substantially the same as that disclosed in the first embodiment. The longitudinal throughbores 116b and 118b also form a portion of the fluid outlets 122 and 124, respectively. Circular metal ring joint gaskets 125a and 125b may be used to seal the tubular members 116 and 118, respectively, to the flow body 114 in the known manner to insure that outlet flow is directed through the bores 116b and 118b.

The manifold means 126 continuously internally communicates the concentric inlet 120 with each of the enlarged portions 122a and 124a of the outlets 122 and 124, but is formed a little different. The manifold means 126 includes a first straight flow passage portion 126a communicating the inlet 120 with the enlarged portion 122a and a second straight flow passage portion 126b communicating the inlet 120 with the enlarged portion 124a. The first and second portions 126a and 126b are formed angled relative to the axis X—X so they intersect at the inlet 120. This arrangement allows streamline flow from manifold 126 to outlet 122 or 124 in a streamline manner giving lower pressure drop through the valve.

The flow control balls or ball members 128 and 130 are disposed in the enlarged portions 122a and 124a of the outlets 122 and 124, respectively, for downstream fluid sealing with the annular seat surfaces 116d and 118d in a manner essentially identical to the first embodiment.

The ball operator means includes an operating shaft 134 and ball connecting shaft 136 rotatably disposed in straight operating bore 114b formed in the body 114. The operating bore 114b also positions the shafts 134 and 136 in the desired concentric longitudinal alignment. The operating shaft 134 includes an internal bladed end 134a received in or connected to the slot 130c formed in the ball member 130 and an external end 134b which may be connected to a suitable valve actuator (not illustrated). A concentrically disposed conventional packing gland 138 blocks leakage of fluid about the shaft 134. The unsealed ball interconnecting shaft 136 includes a first bladed end 136a received in an operating slot 128c of the ball member 128 and second bladed end 136b received in an operating slot 130d of the ball 130. The bladed ends 136a and 134a of the shaft 136 and the associated ball operating slots 128c and 130c are arranged so that when the ball member 128 is in the open position the ball member 130 is in the closed position as illustrated in FIG. 2. Rotation of the shaft 134 effected by manipulation of the end 134b externally of the flow housing 112 also rotates as an integral unit the balls 128 and 130 and the shaft 136. Movement of the shaft 134 to selectively place the ball 130 in the closed position and block flow through outlet 124 will automatically move the ball 128 to the open position for enabling flow through outlet 122. Manipulated movement of the shaft 134 to selectively place the ball 130 in the open position for enabling flow through outlet 124 will automatically move the ball 128 to the closed position for blocking flow through outlet 122.

In the second embodiment, the ball connecting shaft 136 is rotatably mounted or journaled in tubular bearings or bushings 150a and 150b secured in the operating bore 114b adjacent the bladed ends 136a and 136b. The tubular mounting bushings are press fitted in the bore 114b in the usual or conventional manner during installation of the shaft 136 and also serve to limit longitudinal movement of the shaft 136 during rotational operation thereof.

To ensure continuous sealing contact of the outer spherical surfaces 128a and 130a of the balls 128 and 130 with the annular arcuate sealing surfaces 116d and 118d of the tubular members 116 and 118, a biased ball follower means, generally designated 160, is disposed in the enlarged portions 122a and 124a of respective outlets 122 and 124.

The biased follower means 160 for continuous maintaining the ball 128 in sealing contact with the seat 116d includes a ball follower member 162 and a Belleville biasing spring 164 while that for the ball 130 includes follower member 166 and Belleville biasing spring 168. As the biased follower means for the ball 130 is essentially identical to that for the ball 128 it is only necessary to describe those for the latter ball. It is understood that like parts for the biased follower means 160 for the closure ball 130 operate or function in the same manner. The ball follower member 162 is ring shaped having an arcuate annular surface 162a that bears against the outer spherical surface 128a of the ball 128 while permitting the desired operating rotation thereof. The follower member 162 also forms a flat downwardly facing surface 162b that engages a portion of the biasing spring 164. The steel biasing Belleville spring 164 is sized and shaped to force the follower 162 against the ball 128 for continuously maintaining the outer spherical surface 128a in sealing contact with the downstream seat 116d. To preclude any upstream sealing from occurring that may interfere with the desired downstream sealing, either or both of the ball follower 162 or biasing spring 164 may be provided with fluid communicating vent holes or slots (not illustrated).

The use and operation of the apparatus in FIG. 2 to selectively enable or block fluid flow through outlets 122 and 124 is essentially identical to that of the first embodiment. In both embodiments the fluid flow is controlled to be directed through one outlet at all times, with the open and closed outlet being selected by manipulation of the operating shaft 134 from externally of the flow housing 112. The selectively controlled closed flow outlet 122 or 124 may be alternated or sequenced as desired to provide maximum flexibility and user convenience while insuring that the contained flow system C at all times is protected against overpressure conditions.

USE AND OPERATION

In the use and operation of the first embodiment of the present invention illustrated in FIG. 1, the apparatus 10 is assembled in the manner illustrated. The inlet 20 is installed in flow communication with the pressurized fluid system C and the outlet nozzles 16 and 18 placed in flow communication with the safety devices A and B. The operating shaft 34 is then rotated a quarter turn to selectively place either the ball 28 or the ball 30 in the open position. If the ball 28 is placed in the open position as illustrated in FIG. 1, the ball 30 is automatically or inherently rotated to the closed position by the integral movement resulting from operating quarter turn movement of the operating shaft 34. If the ball 30 is placed in the open position by rotation of the operating shaft 34, the connecting shaft 36 also moves the ball 28 to the closed position in the same manner. As a result of this selective outlet flow path arrangement, at least one of the safety devices A and B is always in protective fluid communication with the pressurized fluid system C while the other safety device is isolated from fluid communication with the pressurized fluid system C. In this manner the pressurized fluid system C is at all times protected from an overpressure condition. The isolated safety device A and B not placed in fluid communication with the fluid system C may be maintained or removed for repair and testing and then reinstalled. In essence the apparatus 10 serves to provide at all times one outlet flow path and at least one closed flow path from the inlet.

The operation of the apparatus 10 of the second embodiment shown in FIG. 2 is substantially the same as the first embodiment.

The present invention insures that one fluid pressure safety device is always on line and operable. The flow control member controlling fluid flow to a safety device is easily operated as only a 90° or quarter turn is necessary to move the flow control member between open and closed positions for shifting between separate independent safety devices. Relatively simple sealing members are provided for sealing against the flow control members and are easily assembled within the valve body. This invention has other uses such as, for example, diverting flow from a pair of inlets to a single outlet.

Since certain changes or modifications may be made in the disclosed embodiment without departing from the inventive concepts involved, it is the aim of the appended claims to cover all such changes and modifications falling within the true spirit and scope of the present invention.

What is claimed is:

1. Apparatus for controlling fluid communication from a pressure vessel to a pair of fluid pressure safety devices to insure that fluid communication is provided between the pressure vessel and one of the safety devices and that fluid communication is blocked to the other of said safety devices; said apparatus comprising:

a housing having an inlet passage in fluid communication with the pressure vessel and a pair of outlet passages in fluid communication with the inlet passage, said housing having a valve chamber communicating with each of said outlet passages and a separate bore extending between said valve chambers;

a ball valve member in each of said valve chambers movable between open and closed positions relative to the outlet passages, said ball valve members mounted for rotation about a common rotational axis with each ball valve member having a central bore alignable with the associated outlet passage;

a connecting member within said separate bore of said housing comprising a longitudinally extending shaft extending between said ball valve members and operably connected to said ball valve members for simultaneous rotation of said ball valve members about said common rotational axis between open and closed positions, said shaft being connected to said ball valve members in such a manner that one ball valve member is in an open position when the other ball member is in a closed position; and operator means for providing simultaneous rotation of said ball valve members and shaft between open and closed positions relative to said outlet passages with one ball valve member being in an open position and the other ball valve member being in a closed position.

2. Apparatus as set forth in claim 1 wherein said ball valve members have elongate slots therein, and said opposed ends of said shaft fit within said slots for interlocking said ball valve members and maintaining said ball valve members in a desired rotational relation to each other with one ball valve member being maintained in a closed position and the other ball valve member being maintained in an open position relative to said outlet flow passages.

3. Apparatus as set forth in claim 1 wherein said operator means includes an operating shaft in axial alignment with said connecting shaft and connected to one of said ball valve members on a side thereof opposite said connecting shaft for rotation of said one ball valve member upon actuation of said operator means thereby effecting simultaneous rotation of the other ball valve member through said connecting shaft with said ball valve members being maintained in interlocked position throughout the entire operation thereof.

4. Apparatus for controlling fluid communication from a pressure vessel to a pair of fluid pressure safety devices to insure that fluid communication is provided between the pressure vessel and one of the safety devices and that fluid communication is blocked to the other of said safety devices; said apparatus comprising:
- a housing having an inlet passage in fluid communication with the pressure vessel and a pair of outlet passages in fluid communication with the inlet passage with each of said outlet passages having an enlarged diameter portion;
- a separate longitudinally extending connecting passage in said housing between said enlarged diameter portions of said outlet passages;
- a ball valve member in each of said enlarged diameter portions mounted for movement between open and closed positions relative to said outlet passages, said ball valve members mounted for rotation about a common rotational axis with each ball valve member having a central bore alignable with the associated outlet passage, the longitudinal axis of the central bore of one ball valve member being at right angles to the longitudinal axis of the central bore of the other ball valve member;
- a connecting shaft in said connecting passage having opposed ends connected to said ball members for interlocking said ball valve members for simultaneous rotative movement for maintaining one ball valve member in open position with the other ball valve member in a closed position; and operator means actuated externally of said housing for providing simultaneous rotation of said interlocked ball valve members and shaft between open and closed positions relative to said outlet passages with one ball valve member maintained in an open position and the other ball valve member maintained in a closed position.

5. Apparatus as set forth in claim 4 wherein a separate tubular member is detachably connected to said body adjacent each of said enlarged diameter portions to form at least a portion of said outlet passage to an associated fluid pressure safety device, the ball valve member associated with an enlarged diameter portion being inserted and removed from the associated enlarged diameter portion upon detachment of said separate tubular member.

6. Apparatus as set forth in claim 5 wherein said tubular member defines an annular valve seat for the associated ball valve member, and resilient means in said enlarged diameter portion urge said ball valve member into sealing engagement with said annular valve seat.

7. Apparatus as set forth in claim 4 wherein said central bore extends longitudinally through each of said ball members, and said connecting shaft has a longitudinal axis extending at right angles to the longitudinal axes defined by the central bores of said ball members.

* * * * *